United States Patent
Garney

(10) Patent No.: US 7,640,426 B2
(45) Date of Patent: Dec. 29, 2009

(54) METHODS AND APPARATUS TO MANAGE HARDWARE RESOURCES FOR A PARTITIONED PLATFORM

(75) Inventor: John Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 747 days.

(21) Appl. No.: 11/396,126

(22) Filed: Mar. 31, 2006

(65) Prior Publication Data

US 2007/0234031 A1 Oct. 4, 2007

(51) Int. Cl.
*G06F 9/00* (2006.01)
*G06F 15/177* (2006.01)

(52) U.S. Cl. .......................................... 713/2
(58) Field of Classification Search ................ 713/2
See application file for complete search history.

(56) References Cited

U.S. PATENT DOCUMENTS

| 6,421,775 | B1* | 7/2002 | Brock et al. ................ | 713/1 |
| 2003/0033512 | A1* | 2/2003 | Austen et al. ............. | 713/2 |
| 2005/0015581 | A1* | 1/2005 | Chen ........................... | 713/2 |
| 2005/0216720 | A1* | 9/2005 | Michaelis et al. .......... | 713/2 |
| 2007/0300299 | A1 | 12/2007 | Zimmer et al. | |
| 2008/0244598 | A1 | 10/2008 | Tolopka et al. | |

OTHER PUBLICATIONS

DeviceForge.com, "Intel to release next-gen BIOS technology under open source license," Jun. 1, 2004, 3 pages.
Tom Niemela and Lindsay R. Vega, "The Future of BIOS: Modular, Scalable, Driver-Based Framework for EFI," Apr. 28, 2004, 7 pages.
John G. Spooner, "Adios to BIOS," Dec. 30, 2003, 2 pages.
Wikepedia, "Extensible Firmware Interface," 1 page.
Brian Richardson, "Evolution of BIOS: EFI, the Framework, and beyond," Sep. 17, 2004, 5 pages.
John G. Spooner, "Writing an end to the bio of BIOS," Dec. 30, 2004, 3 pages.
Intel, "Intel® Platform Innovation Framework for EFI," 2005, 6 pages.
Michael S. Richmond, "Intel's BIOS Replacement Roadmap," Copyright 2004, 35 pages.

* cited by examiner

*Primary Examiner*—Thomas Lee
*Assistant Examiner*—Mohammed H Rehman
(74) *Attorney, Agent, or Firm*—Hanley, Flight & Zimmerman, LLC.

(57) ABSTRACT

Methods and apparatus are disclosed to boot a basic input/output system (BIOS) for a partitioned platform. An example method disclosed herein identifies at least one hardware component unique to a partition, determines which hardware components have commonality with the partition, initializes the at least one hardware component having commonality, and initializes the at least one hardware component unique to the partition. Other embodiments are described and claimed.

25 Claims, 4 Drawing Sheets

--- PRIOR ART ---

METHODS AND APPARATUS TO MANAGE HARDWARE RESOURCES FOR A PARTITIONED PLATFORM

FIELD OF THE DISCLOSURE

This disclosure relates generally to computer system platforms and boot procedures thereof, and, more particularly, to methods and apparatus to optimize a basic input/output system (BIOS) for a partitioned platform.

BACKGROUND

Computing devices, personal computers, workstations, and servers (hereinafter "computer" or "computers") typically include a basic input/output system (BIOS) as an interface between computer hardware (e.g., a processor, chipsets, memory, etc.) and an operating system (OS). The BIOS includes firmware and/or software code to initialize and enable low-level hardware services of the computer, such as basic keyboard, video, disk drive, input/output (I/O) port, and chipset drivers associated with a computer motherboard.

A computer that executes separate and multiple copies of an OS on computer hardware is referred to as a partitioned platform. Each instance of a separate OS on the platform is referred to as a partition of the platform and may use shared hardware resources (e.g., same central processing unit (CPU), same bus, etc.), yet use non-overlapping subset(s) of memory (e.g., random access memory (RAM), read-only memory (ROM), dynamic random access memory (DRAM), hard-drive space, etc.).

A partitioned platform may also have dedicated resources instantiated by server hard partitioning. Servers that employ hard partitioning may have a complete set of resources fully replicated in each partition. A rich (i.e., complete) set of resources may include multiple CPU's, large amounts of memory, and many I/O devices. As such, each partition, separated by various hardware mechanisms, typically includes a full BIOS that operates fully and independently. The hardware mechanisms for separating partitions, such as a service processor, are expensive to implement and time consuming.

Whether the underlying resources (i.e., the hardware and associated systems) are shared or dedicated, each partition executes in an environment that is independent of other environments within other partitions of the platform. Because the partitions operate independently and are unaware of the existence of any other partitions on the platform, the applications executing on their particular partitions are secure from one another. In such a case, even if one application contains a security flaw, such vulnerability is limited to only the breached partition, thereby leaving any other partitions unaffected. However, such independence results in each partition's BIOS executing all of its initialization instructions, even if one or more of the partitions has already executed such instructions.

FIG. 1 is a diagram showing how a known computer platform 100 may be configured to include multiple partitions. While computer platforms may have any number of separate partitions, the platform 100 of FIG. 1 includes an example first partition 105, an example second partition 110, and an example third partition 115. Each of the partitions 105, 110, 115 includes a corresponding BIOS 120, 125, 130, a corresponding OS 135, 140, 145, and any number of corresponding applications 150, 155, 160. While each of the partitions 105, 110, 115 of FIG. 1 are created via server style hard partitions, the partitions 105, 110, 115 may also be created by a virtual machine monitor (VMM), discussed in further detail below. Each of the partitions uses platform hardware 165 in a shared manner, a dedicated manner, or various combinations of shared and dedicated use.

Prior to partition creation, the platform hardware 165 initiates a CPU reset upon power-up. As discussed in further detail below, one of the multiple processors 170 is typically hard-coded to access a specific memory location, such as a fetch to BIOS 175 boot instructions. The BIOS 175 initializes memory 180 and a base minimum amount of platform hardware 165 to eventually allow each partition to run independently. However, creating each partition also requires initialization of a service processor 185. The service processor 185 thereafter creates each partition 105, 110, 115 in a serial manner. As a result, each of the partition BIOS 120, 125, 130 performs initialization in a serial manner. Initialization may include, but is not limited to, power on self test (POST) procedures for each CPU 170 and memory 180. Furthermore, because the platform hardware BIOS 175 already initialized the memory 180, the serial creation of partitions by the service processor 185 results in redundant procedures. For example, such POST procedures already performed by the platform BIOS 175 are repeated when each partition BIOS 120, 125, 130 also performs memory 180 initialization, thereby wasting significant amounts of time.

DETAILED DESCRIPTION

Figure 1:
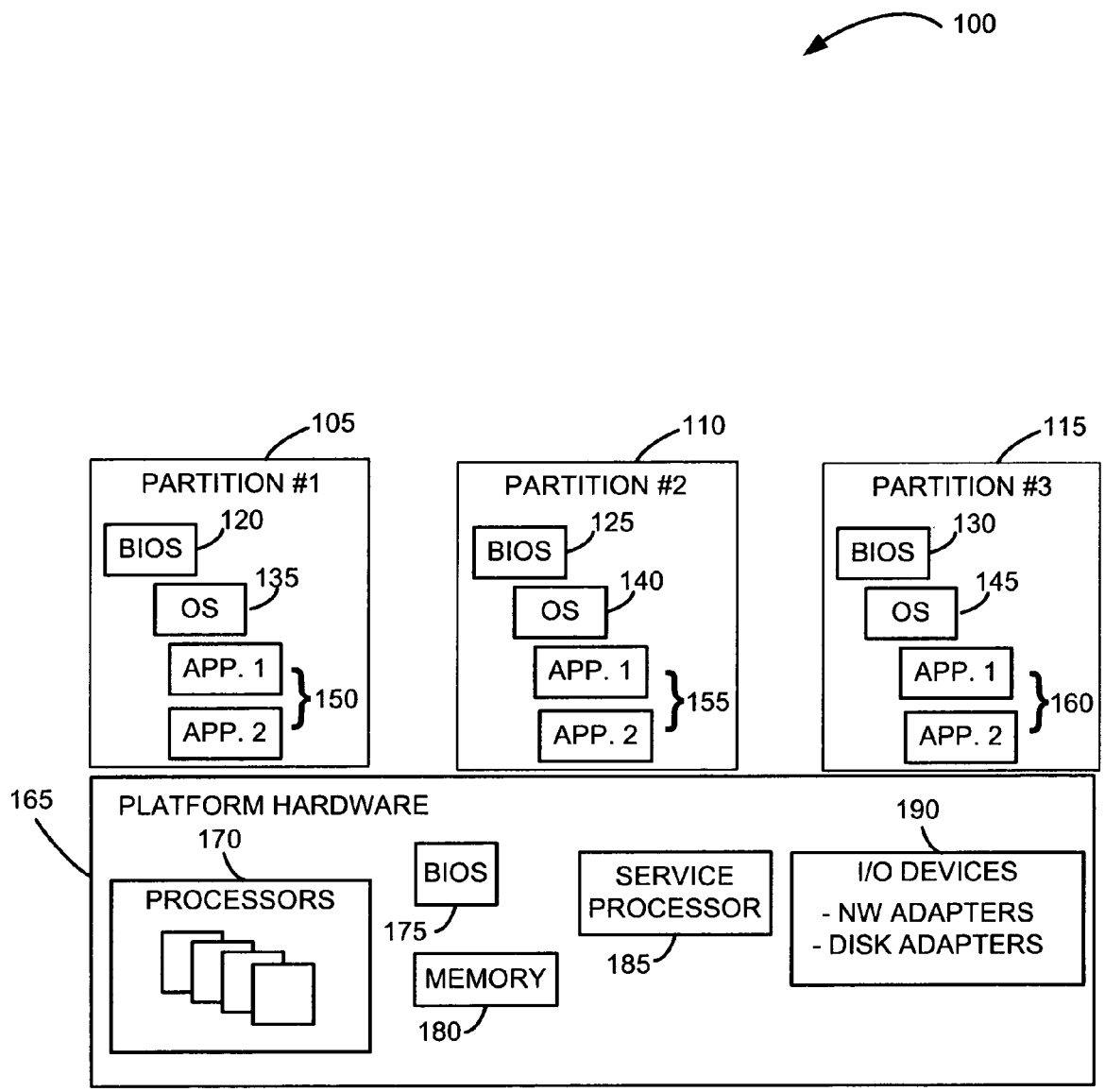
FIG. 1 is a block diagram of a prior art computer platform having multiple partitions.

Generally speaking, each computer system has a particular set of hardware that, when working together, allows the computer system to execute an operating system. Such computer systems may include personal computers, workstations, PDAs, kiosks, and servers. Furthermore, upon successful initiation of an operating system, the computer system may thereafter execute particular user applications, such as word processing applications, spreadsheet applications, Internet browser applications, games, and/or other custom and commercial applications. Prior to executing the applications, the operating system typically initializes and takes control of the computer system hardware, including hard drive(s), memory, I/O facilities including, but not limited to disk adapters, compact disk (CD) drives, digital versatile disk (DVD) drives, local area network (LAN) adapters, serial ports, terminals, graphics/audio cards, etc. Because the operating system is itself a software application read from a hard drive, a base level initialization of the underlying hardware is accomplished via BIOS procedures before the operating system may take overall control of the computer system. Base level initialization may include initialization of computer system components such as, for example, main memory (e.g., RAM), a non-volatile storage (e.g., a hard drive), a central processing unit (CPU), and various chipsets.

Typical approaches to initializing a partitioned platform may employ a full platform set of resources to be part of every partition, sometimes referred to as server style "hard" partitions. Benefits of a partitioned platform include a prevention of conflicts between applications (i.e., programs running on a computer) running on any other partitions. For example, if an error occurs in one partition, the execution of applications in other partitions is unaffected and continues as normal. Consequently, the hard partitions typically include the service processor 185 to initialize parts of the system and create partitions before any CPUs are allowed to perform duplicative initialization procedures due to a duplicate BIOS in each partition. Alternatively, a partitioned platform may be implemented by virtualization to create "soft" partitions with a full or emulated BIOS in each partition. For example, partitions implemented by virtualization typically have no service processor and employ a single CPU to initialize the system pursuant to a system-wide BIOS. The VMM is loaded by the CPU to create individual partitions for the platform. Additionally, the VMM may provide an individual full BIOS in each partition that implements redundant operations, or the VMM may include stubs or "fake" BIOSs for each partition. While the methods and apparatus to optimize a BIOS for a partitioned platform described herein apply to either partitions created by way of virtualization, partitions created by server style hard partitions, or various combinations thereof, the remaining embodiments are described, without limitation, in view of server style hard partitions. As each partition includes a copy of BIOS instructions, additional memory resources are consumed by having multiple copies of the same BIOS on a memory device (e.g., shared RAM, shared hard-drive, etc.).

Similar to a single partition computer/server system, a multi-partitioned computer/server system also performs low-level initialization procedures during boot time. As discussed above, the BIOS routines/instructions typically dictate hardware functionality of the hardware platform to prepare various components for operation before an operating system (OS) takes control of the computer/server system. Because each partition has a BIOS, the initialization of each partition typically executes the BIOS instructions, some of which perform POST procedures/instructions on various pieces of platform hardware.

POST procedures are programs that ensure hardware is present and working properly before loading an operating system. When problems are detected as a result of POST procedures, the computer/server system typically emits beeps from a speaker because video drivers may not yet be resident and operating to enable video display of errors to a user. Various BIOS manufacturers have unique beep codes that allow diagnostics without system video capabilities. The POST procedures that execute on hardware vary in complexity and time to complete. A very thorough POST procedure typically takes a significant amount of time to complete execution.

When a typical computer system (e.g., a non-partitioned system) is powered-up from a cold boot, a CPU reset is invoked. In particular, a chipset or CPU is typically hard-coded to fetch the first BIOS boot instructions during power-up at the top of an addressable memory (e.g., a flash-memory). The conventional BIOS boot process may begin executing BIOS boot instructions located at the addressable memory location, sometimes referred to as a jump location, and initialize a sufficient amount (base level) of platform hardware prior to more advanced sub-system initialization procedures. However, a computer system employing server style hard partitioning typically invokes the service processor 185 prior to the CPUs 170. The service processor 185 will typically have its own BIOS and execute in a monolithic (e.g., embedded ROM) style set of programs and not have access to more advanced resources, such as disks and/or network resources.

Accordingly, the service processor 185 may use explicit dedicated resources (e.g., RAM, ROM, etc.) that are not used by the normal execution of the system. Additionally, the service processor 185 may perform various POST procedures on various system resources and initialize a complex interconnect that allows and/or restricts various CPUs 170 to/from access of various system resources, such as RAM and/or ROM. However, while each one of the CPUs 170 executes the BIOS (e.g., one of 120, 125, 130), such BIOS execution results in redundant POST procedures.

For example, every partition for a typical platform requires a CPU and memory for proper operation. In view of the example first partition 105, when the processor (CPU) initializes, it refers to the BIOS 120, which advances through various initialization procedures. Such procedures include an initialization of memory 180, which was already initialized at a global level by the BIOS 175 of the platform hardware 165. Upon completion of the creation of the first partition 105, the service processor 185 proceeds to create the second partition 110. Much like the initialization of the first partition 105, a second CPU of the several processors 170 refers to an addressable memory location that permits execution of BIOS 125 instructions. The BIOS 125 instructions execute to initialize hardware, including the memory 180 that was previously initialized by the platform BIOS 175 and by the first partition 105 BIOS 120. Persons of ordinary skill in the art will appreciate that such a serial initialization procedure includes redundancies that consume valuable time. Hardware initializations performed at early stages of a computer system boot process establish that, for example, the memory 180 is working properly. Despite this determination, subsequent partition creation by the service processor 185 results in compounding redundancies that are exacerbated as the number of partitions for any particular computer system grows.

Each partition includes many of the same BIOS 120, 125, 130 instructions, such as POST instructions to verify properly functioning hardware (e.g., a hard-drive test, RAM integrity test, etc.). Those same instructions are repeated multiple times despite the fact that previously executed POST instructions have indicated satisfactory results for the same hardware in conjunction with a POST performed by an adjacent partition. Such duplicative POST instructions consume valuable time and computing resources during the boot process.

Manufacturers of enterprise class servers are particularly concerned with the amount of time consumed during the boot process. Computer/server systems that boot faster are more likely to satisfy rigorous metrics of "high availability servers." A high availability server is defined by its ability to be up and running 99.999% of the time during a year. This high standard translates into a limit of no more than approximately five minutes of downtime per year. Initialization of various hardware components consumes a substantial amount of boot time. While some hardware and/or firmware component initialization procedures require only an appropriate voltage be applied to it, other hardware and/or firmware components require additional tests to verify proper operation. In particular, many hardware component initialization procedures include POST. When redundant hardware POST procedures are performed, there is no additional knowledge gained about the hardware in exchange for the time spent performing the redundant POST procedures.

Computer systems may also contain many more types of hardware components that require initialization, with or without POST procedures. For example, such other hardware components may include disk adapters, LAN adapters, serial/parallel ports, advanced graphics cards (AGP cards), sound cards, peripheral component interconnect (PCI) cards, and small computer system interface (SCSI) devices. When a computer system applies power to each of these devices, they may each execute independent POST procedures, such as POST procedures stored on a local BIOS (typically referred to as an "option ROM") of the component. Regardless of the type of hardware devices of the computer system that are to be initialized, or whether the BIOS includes initialization for POST and non-POST devices, duplicative initialization of the same hardware component wastes significant amounts of time in a partitioned system.

Figure 2:
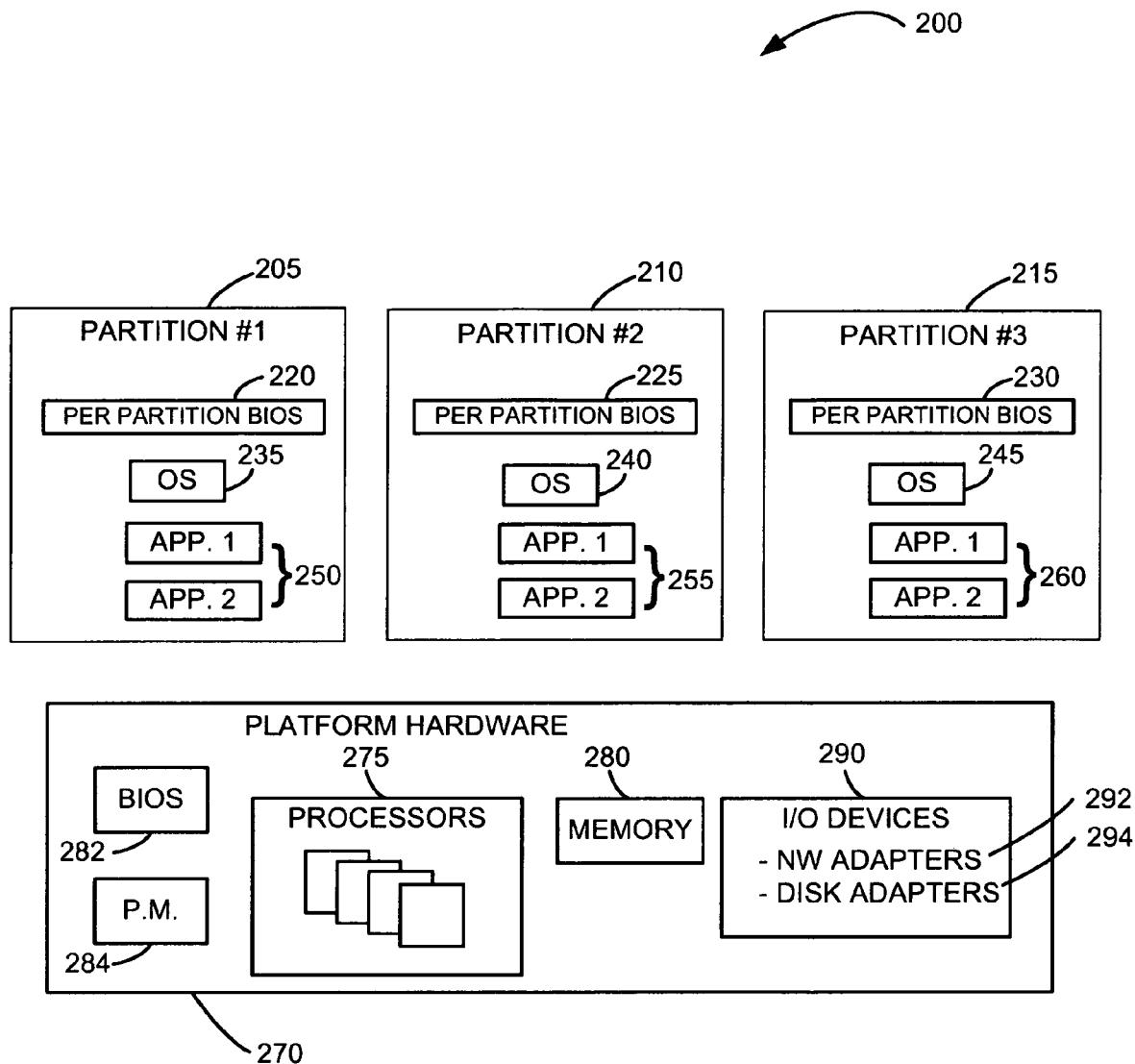
FIG. 2 is a block diagram showing an example computer platform having multiple partitions.

FIG. 2 is a diagram of an example computer platform 200 to optimize BIOS for a partitioned platform. Much like the known computer platform 100 of FIG. 1, the example platform 200 of FIG. 2 includes an example first partition 205, an example second partition 210, and an example third partition 215. However, unlike the known computer platform 100 of FIG. 1, the example partitions 205, 210, 215 of FIG. 2 further include a corresponding per-partition BIOS 220, 225, 230. As discussed in further detail below, the per-partition BIOS 220, 225, 230 differs, in part, from the traditional partition BIOS 120, 125, 130 in that the former are tailored for focused application by a partition manager. The example partitions 205, 210, 215 also include a corresponding OS 235, 240, 245, and any number of corresponding applications 250, 255, 260 capable of executing on each of the partitions. The example computer platform 200 also includes platform hardware 270 upon which the partitions operate. Much like the platform hardware from FIG. 1, the example platform hardware 270 of FIG. 2 includes any number of processors 275 (CPUs) for each of the partitions and/or some of the partitions may share one or more processors 275. The example platform hardware 270 also includes memory 280 that may be physically dedicated to each of the many partitions 205, 210, 215 and/or one or more blocks/units of memory may be shared among one or more of the partitions 205, 210, 215. Although the memory 280 is shown as a single block in FIG. 2, persons of ordinary skill in the art will appreciate that the memory may include several independent memory blocks/units, wherein each unit may be dedicated to specific partitions. Furthermore, the memory may include RAM, DRAM, flash-memory, ROM, one or more hard drives, etc. For example, each of the partitions 205, 210, 215 may have a dedicated block of 500 megabytes of RAM, wherein each block makes up a portion of the whole continuous RAM memory 280. Alternatively, the memory 280 may be several separate memories that are physically separated from each other. The platform hardware 270 also includes various types of I/O devices 290 including, but not limited to, network adapters 292 and disk adapters 294.

Unlike the platform hardware of FIG. 1, the platform hardware 270 of FIG. 2 does not include a service processor. Furthermore, a BIOS 282 of FIG. 2 is shown inside the platform hardware 270, as is a partition manager 284. Without limitation, the partition manager 284 may be implemented as an application programming interface (API), various hardware, gates, and/or other programs stored on a non-volatile memory that is loaded into memory.

The partition manager 284 includes an-overall description of the platform 200. In other words, the partition manager 284 includes a road map of partitions. Because the partition manager 284 is aware of the total number of partitions, and has access to the per-partition BIOS 220, 225, 230 for each partition 205, 210, 215, the partition manager 284 determines which system resources 270 are allocated to the partitions 205, 210, 205. As discussed in further detail below, the partition manager 284 may configure the BIOS 282 to take advantage of such multi-platform resource allocation by initializing such hardware once, rather than multiple times during a platform boot, and/or during additions of new partitions. This initialization of such hardware may be done once in the BIOS 282 or in the per-partition BIOS 220, 225, 230 depending on what hardware is allocated to which partition. Furthermore, the partition manager 284 automatically analyzes the platform 200 for additional partitions that may be added during runtime. For example, a system administrator may invoke an additional partition to accommodate a new application, such as, for example, a new database indexing application. Subsequently, or contemporaneously, the partition manager 284 may analyze the platform 200 to detect the new partition and determine which resources it requires by accessing its per-partition BIOS. Underlying hardware resources that have already been initialized are not re-initialized (e.g., POST procedures). However, if the newly added example partition uses a hardware component that has not previously been initialized and/or is not listed in the per-partition BIOS of the other partitions, then such hardware component(s) are initialized at that time.

In the example partitioned platform 200, platform initialization may be separated into four parts. First, underlying platform hardware 270 that affects all partitions is initialized. Similarly, any such hardware 270 needed before individual partitions may be created is initialized. In other words, the hardware 270 that affects all partitions has a degree of commonality with those partitions. As discussed above, the hardware that affects all partitions is determined, in part, by the information and/or prior efforts of the partition manager 284. Initialization of the underlying platform may proceed from a cold boot in the following manner. A CPU reset causes the CPU to begin execution at a hard-coded memory location that typically contains a jump instruction that points to an alternate location containing BIOS boot instructions. The processor 275 boots the BIOS 282, which proceeds to initialize a minimum or base level amount of platform hardware 270 that is required for the partition manager 284. The partition manager 284 may be an API and/or other program stored on a non-volatile memory (e.g., ROM, flash-memory, hard-drive) that is loaded into memory 280 for operation. For example, while the memory 280 may be several gigabytes in size, the BIOS 282 may initialize only a small portion sufficient to load the partition manager 284 from, for example, flash-memory that may be located on a motherboard. Because the partition manager 284 was invoked after a minimal and/or base level amount of resources initialized, the partition manager 284 may proceed to partition creation without having consumed a large amount of time. The partition manager 284 may also identify any additional platform hardware 270 that may require initialization due to a commonality or dependency on the several partitions 205, 210, 215.

During a second part of platform 200 initialization, each individual partition is created, in which fragments of the underlying hardware are allocated to each partition. For example, a specific non-overlapping range of memory may be allocated to each partition in a hard-drive, RAM, etc.

Third, additional platform resources not previously initialized on a global scale are now initialized in view of the needs of each particular partition. For example, if the underlying platform hardware 270 includes an individual CPU for the first partition 205, second partition 210, and third partition 215, then the partition manager 284 may invoke a CPU reset on each of these processors simultaneously. As a result, each of the CPUs begins execution from its hard coded memory location, which may further point to a jump location. Such memory locations or jump locations point to the respective per-partition BIOS 220, 225, 230 for each partition 205, 210, 215. Unlike the platform 100 of FIG. 1, the platform 200 of FIG. 2 initializes each processor, specific memory 180 blocks, and I/O resources in parallel rather than in series. Furthermore, each partition 205, 210, 215 invokes initialization procedures in view of only such hardware resources necessary for its proper operation. Thus, if the first partition 205 is dedicated to performing database management operations, in which it downloads and uploads record entries from a network, then that partition only performs POST procedures for its particular associated network adapters 292 and ignores any initialization procedures for hardware unrelated to the needs of the first partition 205.

During a fourth part of platform 200 initialization, upon successful completion of a base-level hardware initialization, partition control is handed-off to the corresponding OSs 235, 240, 245, in which each OS may have specific initialization procedures within each partition.

The BIOS 282 initializes underlying platform hardware 270 that is common to any existing and/or planned partitions. At a most rudimentary level, each partition 205, 210, 215 requires some processor 275 resources, some memory 280 resources, and some I/O device 290 resources for proper operation. As such, the BIOS 282 consolidates the base level initialization at one time to allow each individual partition 205, 210, 215 to take advantage of underlying platform hardware 270 that is ready to operate upon request. Unlike the known computer platform 100 of FIG. 1, in which each partition 105, 110, 115 performed duplicative initialization instructions on the underlying platform hardware 170, the BIOS 282 of FIG. 2 saves considerable amounts of time as a compliment to the per-partition BIOS 220, 225, 230 by performing such initialization instructions (e.g., POST instructions for minimal required memory 280, and/or various I/O devices 290) at a single time prior to further initialization by each individual partition 205, 210, 215. Furthermore, each of the partitions 205, 210, 215 performs initialization procedures in parallel rather than serial, thereby saving additional time.

Because the BIOS 282 initializes the base-level platform hardware 270, which is needed prior to creation of some and/or all of the partitions 205, 210, 215, each of those partitions is relieved of that burden and may use its corresponding per-partition BIOS 220, 225, 230 in a focused and time-efficient manner. Such focused initialization is accomplished with the per-partition BIOS 220, 225, 230 to address specific platform hardware 270 that is needed by a particular partition.

Although FIG. 2 illustrates platform hardware 270 to include processors 275, memory 280, and I/O devices 290, the underlying platform hardware 270 may include any other hardware components based upon the particular needs and/or objectives of various partitions.

Figure 3:
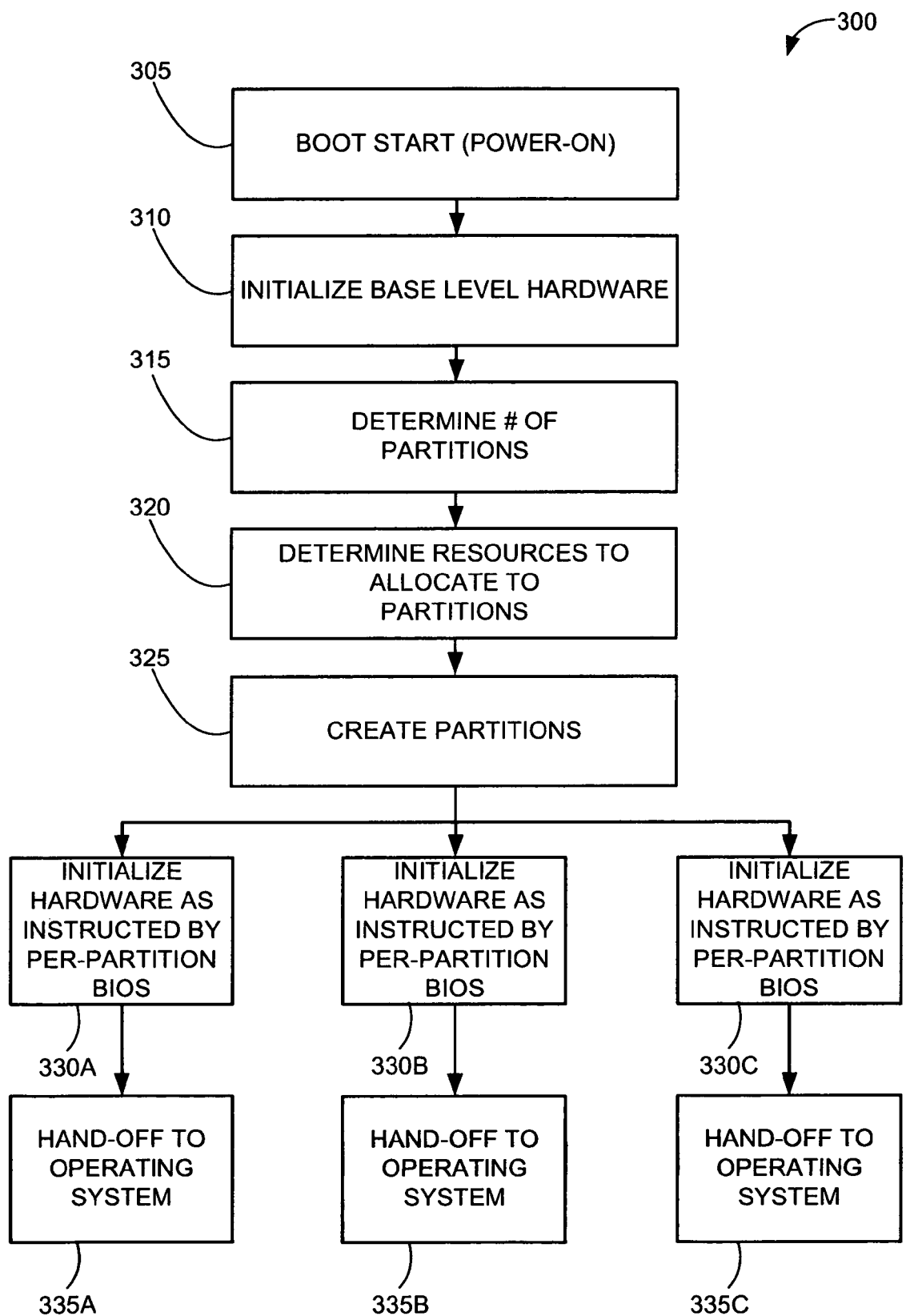
FIG. 3 is a flowchart illustrating an example disclosed process to optimize BIOS for a partitioned platform.

FIG. 3 is a flowchart of an example process 300 to optimize BIOS for a partitioned platform. The process 300 may be carried out by one or more components of FIG. 2, as will be discussed in further detail below. Certain blocks of the process 300 may be carried out by such components and/or a processor, such as that illustrated in FIG. 4. Further, some parts of the process 300 may be carried out manually or may be implemented using hardware, software, firmware, or any suitable combination thereof.

The process 300 begins with power-up (block 305) of a computer system that will be configured to have multiple partitions. The computer system may include underlying platform hardware, such as the hardware 270 of FIG. 2 that further includes various peripherals that maintain and execute independent BIOS procedures. Such peripherals may include I/O adapters, disk drive adapters, and network adapters. The BIOS 282 initializes a base-level amount of platform hardware resources 270 for the platform 200 before the partitions 205, 210, 215 are created (block 310). Example base-level hardware initialization may include initializing a relatively small amount of memory 280, which permits the partition manager 284 to be loaded from a non-volatile memory (e.g., flash-memory, hard disk, ROM, etc.). When such minimal underlying hardware 270 is initialized to support the partition manager 284, the number of platform 200 partitions that will independently execute on the platform is determined (block 315). The partition manager 284 determines the number of partitions by accessing the configuration settings stored in the non-volatile memory. Configuration settings may include, but are not limited to, the number of partitions, the hardware common to the partitions, the per-partition BIOS settings of each partition, resource allocation setting for each partition (e.g., dedicated RAM and/or hard-drive memory locations for each partition), and other BIOS settings. Additionally or alternatively, various settings may be retrieved by the partition manager 284 from a non-volatile memory, such as in a flash-memory, ROM, and/or hard disk. Accordingly, the partition manager 284 determines resources to allocate to the partitions at block 320. In particular, the partition manager 284 populates each per-partition BIOS 220, 225, 230 with configuration settings as specified in memory (e.g., memory 180 and/or non-volatile memory). The partition manager 284 creates each partition (block 325) so that specific hardware resources 270 are allocated to each partition 205, 210, 215. For example, the partition manager 284 may allocate one or more processors 275 and/or unit of memory 280 to the first partition 205, while the second partition 210 only includes a single processor 275 and a single unit of memory 280. Additionally or alternatively, the partition manager 284 may configure the platform hardware such that only allocated resources will be detected by each per-partition BIOS 220, 225, 230 As such, any per-partition BIOS 220, 225, 230 may have exclusive access to a subset of partition hardware. In the event that a partition has access to platform hardware for which it is not configured/authorized to use, the per-partition BIOS associated with that partition will only discover the platform hardware that the partition manager 284 deemed appropriate.

Because each partition is created, wherein each partition is assigned its own subgroup of platform resources 270, the per-partition BIOS 220, 225, 230 of each partition 205, 210, 215 executes independently (i.e., in parallel) of the other partitions (blocks 330A, 330B, 330C). As a result, each partition 205, 210, 215 may initialize its resources in parallel without any temporal dependency of completion by another partition. For example, the first partition 205 per-partition BIOS 220 may initialize a specific unit of 500 megabytes of memory (block 330A) while the second partition 210 per-partition BIOS 225 may initialize a separate specific unit of 500 megabytes of memory (block 330B) at the same time. Persons of ordinary skill in the art will appreciate that each per-partition BIOS 220, 225, 230 may continue such independent and parallel initialization procedures for other platform hardware 270 that is specific to each of the created partitions 205, 210, 215. Such focused use of the per-partition BIOSs eliminates both excessive memory consumption and time consumption associated with multi-partition computer systems as compared with traditional multi-partition computer systems that employ redundancy techniques for initialization purposes.

Partitions that have initialized a sufficient amount of platform hardware via the per-partition BIOS instructions may hand-off control to an OS 235, 240, 245 (blocks 335A, 335B, 335C). While specific details regarding additional OS initialization procedures is beyond the scope of this patent, such OS initialization procedures may occur in parallel (blocks 335A, 335B, 335C), as shown in FIG. 3.

Although the foregoing discloses example systems including, among other components, firmware and/or software executed on hardware, it should be noted that such systems are merely illustrative and should not be considered as limiting. For example, it is contemplated that any or all of these hardware and software components could be embodied exclusively in dedicated hardware, exclusively in software, exclusively in firmware, or in some combination of hardware, firmware and/or software. Accordingly, while the following describes example systems, persons of ordinary skill in the art will readily appreciate that the examples are not the only way to implement such systems.

Figure 4:
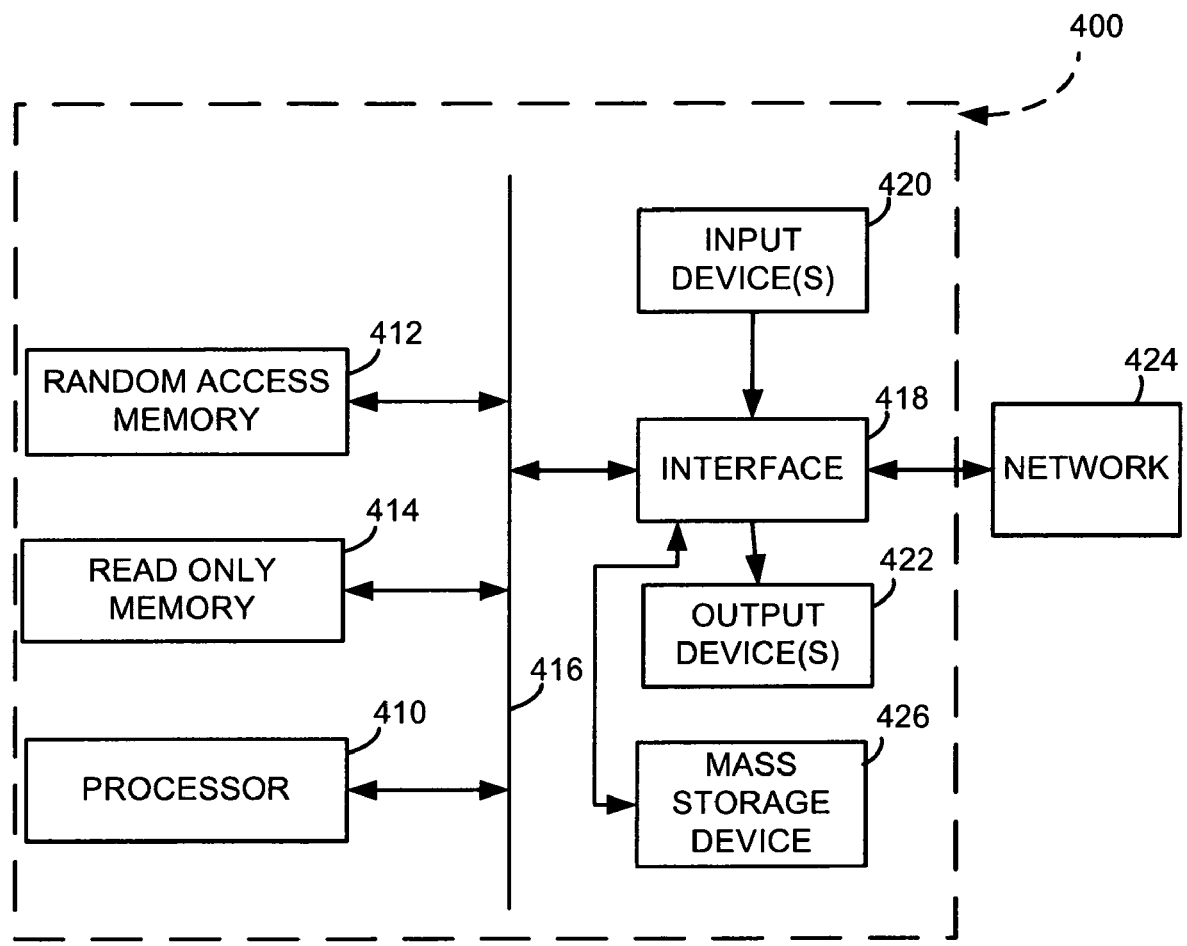
FIG. 4 is a schematic illustration of an example computer that may execute the processes of FIG. 3 to implement the computer platform of FIG. 2.

FIG. 4 is a block diagram of an example computer 400 capable of implementing the apparatus and methods disclosed herein. The computer 400 can be, for example, a server, a personal computer, a personal digital assistant (PDA), or any other type of computing device.

The system 400 of the instant example includes a processor 410. For example, the processor 410 can be implemented by one or more Intel® microprocessors from the Pentium® family, the Itanium® family, the XScale® family, or the Centrino™ family. Of course, other processors from other families are also appropriate.

The processor 410 is in communication with a main memory including a volatile memory 412 and a non-volatile memory 414 via a bus 416. The volatile memory 412 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 414 may be implemented by flash-memory and/or any other desired type of memory device. Access to the main memory 412, 414 is typically controlled by a memory controller (not shown) in a conventional manner.

The computer 400 also includes a conventional interface circuit 418. The interface circuit 418 may be implemented by any type of well known interface standard, such as an Ethernet interface, a universal serial bus (USB), and/or a third generation input/output (3GIO) interface.

One or more input devices 420 are connected to the interface circuit 418. The input device(s) 420 permit a user to enter data and commands into the processor 410. The input device(s) can be implemented by, for example, a keyboard, a mouse, a touch screen, a track-pad, a trackball, isopoint and/or a voice recognition system.

One or more output devices 422 are also connected to the interface circuit 418. The output devices 422 can be implemented, for example, by display devices (e.g., a liquid crystal display, a cathode ray tube display (CRT), a printer and/or speakers). The interface circuit 418, thus, typically includes a graphics driver card.

The interface circuit 418 also includes a communication device such as a modem or network interface card to facilitate exchange of data with external computers via a network 424 (e.g., an Ethernet connection, a digital subscriber line (DSL), a telephone line, coaxial cable, a cellular telephone system, etc.).

The computer 400 also includes one or more mass storage devices 426 for storing software and data. Examples of such mass storage devices 426 include floppy disk drives, hard drive disks, compact disk drives and digital versatile disk (DVD) drives.

As an alternative to implementing the methods and/or apparatus described herein in a system such as the device of FIG. 4, the methods and/or apparatus described herein may alternatively be embedded in a structure such as processor and/or an ASIC (application specific integrated circuit).

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of booting a computer platform having a plurality of partitions comprising:
   identifying a first hardware component unique to a first partition;
   determining a second hardware component having commonality with the first partition and a second partition;
   initializing the second hardware component having commonality and the first hardware component unique to the first partition;
   identifying a third hardware component unique to the second partition; and
   initializing the second partition by initializing the third hardware component and excluding the second hardware component from initialization.

2. A method as defined in claim 1, further comprising executing a per-partition basic input/output system (BIOS) after the hardware components having commonality are initialized, the per-partition BIOS initializing the at least one hardware component unique to the partition.

3. A method as defined in claim 2, wherein the per-partition BIOS comprises initialization instructions for at least one of memory, input/output (I/O) devices, buses, or processors.

4. A method as defined in claim 1, wherein initializing which hardware components have commonality with the partition further comprises initializing at least one of a processor, a memory, a bus, or an input/output (I/O) device.

5. A method as defined in claim 4, wherein initializing the memory comprises initializing at least one of random access memory (RAM), flash-memory, or a disk-drive.

6. A method as defined in claim 1, further comprising a plurality of partitions initializing hardware components unique to each of the plurality of partitions in parallel.

7. A method as defined in claim 6, further comprising retrieving a list of the hardware components associated with the plurality of partitions from a non-volatile memory.

8. A method as defined in claim 7, wherein a partition manager assigns a subset of the list of the hardware components associated with the plurality of partitions to a per-partition basic input/output system (BIOS).

9. A method as defined in claim 7, wherein a partition manager configures a subset of the hardware components associated with the plurality of partitions to be exclusively identified by one of a plurality of per-partition basic input/output systems (BIOS).

10. An apparatus to optimize a computer platform having a plurality of partitions comprising:
    a plurality of hardware components;
    a basic input/output system (BIOS) to initialize a hardware component having commonality with the plurality of the partitions; and
    a per-partition BIOS in each of the plurality of partitions, each per-partition BIOS to initialize a subset of the plurality of hardware components unique to each one of the plurality of partitions, and to exclude initialization of the hardware component having commonality with the plurality of partitions.

11. An apparatus as defined in claim 10, further comprising a partition manager to create the plurality of partitions.

12. An apparatus as defined in claim 11, further comprising a non-volatile memory to store partition configuration data, the partition manager accessing the non-volatile memory for partition creation instructions.

13. An apparatus as defined in claim 12, wherein the partition manager configures the per-partition BIOS in each of the plurality of partitions based on the partition creation instructions in the non-volatile memory.

14. An apparatus as defined in claim 10, wherein the BIOS comprises at least one power-on self test (POST) procedure for at least one of the plurality of hardware components.

15. An apparatus as defined in claim 10, wherein the plurality of hardware components comprises at least one of a processor, a memory, a bus, or an input/output (I/O) device.

16. An article of manufacturing storing machine readable instructions which, when executed, cause a machine to:
    identify a first hardware component unique to a first partition;
    determine a second hardware component having commonality with the first partition and a second partition;
    initialize the second hardware component having commonality and the first hardware component unique to the first partition;
    initialize a third hardware component unique to the second partition; and
    initialize the second partition by initializing the third hardware component and excluding the second hardware component from initialization.

17. An article of manufacture as defined in claim 16, wherein the machine readable instructions cause the machine to execute a per-partition basic input/output system (BIOS) after the hardware components having commonality are initialized, the per-partition BIOS initializing the at least one hardware component unique to the partition.

18. An article of manufacture as defined in claim 17, wherein the machine readable instructions cause the per-partition BIOS to initialize at least one of memory, input/output (I/O) devices, busses, or processors.

19. An article of manufacture as defined in claim 16, wherein the machine readable instructions cause a basic input/output system (BIOS) to initialize at least one of a processor, a memory, a bus, or an input/output (I/O) device.

20. An article of manufacture as defined in claim 19, wherein the machine readable instructions cause the machine to initialize a memory comprising at least one of random access memory (RAM), flash-memory, or a disk-drive.

21. An article of manufacture as defined in claim 16, wherein the machine readable instructions cause the machine to initialize the at least one hardware component unique to a plurality of partitions, the plurality of partitions initialized in parallel.

22. An article of manufacture as defined in claim 21, wherein the machine readable instructions cause the machine to retrieve a list of the hardware components associated with the plurality of partitions from a non-volatile memory.

23. An article of manufacture as defined in claim 22, wherein the machine readable instructions cause the machine to assign a subset of the list of the hardware components associated with the plurality of partitions to a per-partition basic input/output system (BIOS).

24. An article of manufacture as defined in claim 22, wherein the machine readable instructions cause the machine to configure a subset of the hardware components associated with the plurality of partitions to be exclusively identified by one of a plurality of per-partition basic input/output system (BIOS).

25. A computer-implemented method to boot a multi-partition platform, comprising:
    identifying a first partition to utilize a first subset of shared platform resources;
    initializing the first subset of the shared platform resources;
    identifying a second partition to utilize a second subset of the shared platform resources;
    identifying a portion of the shared platform resources common to the first subset and the second subset; and
    tailoring a basic input/output system (BIOS) to initialize the second partition by excluding the portion of the shared platform resources common to the first subset and the second subset.

* * * * *

UNITED STATES PATENT AND TRADEMARK OFFICE
CERTIFICATE OF CORRECTION

| | |
|---|---|
| PATENT NO. | : 7,640,426 B2 |
| APPLICATION NO. | : 11/396126 |
| DATED | : December 29, 2009 |
| INVENTOR(S) | : John Garney |

It is certified that error appears in the above-identified patent and that said Letters Patent is hereby corrected as shown below:

Col. 11, line 29 After "the first partition;" delete "initialize" and insert -- identify --.

Signed and Sealed this

Ninth Day of March, 2010

David J. Kappos
*Director of the United States Patent and Trademark Office*